United States Patent [19]

Wendt

[11] 4,455,487

[45] Jun. 19, 1984

[54] FIRE DETECTION SYSTEM WITH IR AND UV RATIO DETECTOR

[75] Inventor: Roger A. Wendt, Londonderry, N.H.

[73] Assignee: Armtec Industries, Inc., Manchester, N.H.

[21] Appl. No.: 316,923

[22] Filed: Oct. 30, 1981

[51] Int. Cl.[3] .......... G01J 1/00

[52] U.S. Cl. .......... 250/339; 250/372; 340/578

[58] Field of Search .......... 250/339, 372, 554, 342, 250/349, 340; 340/578

[56] References Cited

U.S. PATENT DOCUMENTS

| | | | |
|---|---|---|---|
| Re. 29,143 | 2/1977 | Bianchini . | |
| 3,122,638 | 2/1964 | Steele et al. | 340/578 |
| 3,283,154 | 11/1966 | Giuffrida et al. . | |
| 3,342,995 | 9/1967 | Axmark . | |
| 3,544,792 | 12/1970 | Giltaire | 250/372 |
| 3,665,440 | 5/1972 | McMenamin . | |
| 3,739,365 | 6/1973 | Müller | 340/578 |
| 3,820,097 | 6/1974 | Larson | 340/578 |
| 3,825,754 | 7/1974 | Cinzori et al. | 250/339 |
| 3,931,521 | 1/1976 | Cinzori | 250/339 |
| 3,986,184 | 10/1976 | Castanino et al. . | |
| 4,017,884 | 4/1977 | Facchini et al. . | |
| 4,039,844 | 8/1977 | MacDonald | 250/554 |
| 4,065,758 | 12/1977 | Barbier et al. . | |
| 4,157,506 | 6/1979 | Spencer . | |
| 4,199,682 | 4/1980 | Spector et al. | 250/339 |

*Primary Examiner*—Alfred E. Smith
*Assistant Examiner*—Carolyn E. Fields
*Attorney, Agent, or Firm*—Kenway & Jenney

[57] ABSTRACT

An automatic fire detection system characterized by an extremely low incidence of false alarms utilizes two detection channels, one fed by an infrared (IR) detector and the other by an ultraviolet (UV) detector. Signal processing electronics in each channel produce a normalized output signal proportional to the power of incident IR and UV radiation within specific bandwidths. The system features a ratio detector that repeatedly forms a ratio of the normalized IR and UV inputs and compares the ratio to a known range of values for this ratio that are characteristic of a fire. A discriminator connected to the output of the ratio detector generates a fire alarm signal only if the majority of these ratio comparisons are fire-indicating. The system also includes a feedback loop in the IR processing channel that automatically adjusts the output of the channel to compensate for time-varying background IR radiation such as sunlight.

12 Claims, 3 Drawing Figures

FIRE DETECTION SYSTEM WITH IR AND UV RATIO DETECTOR

BACKGROUND OF THE INVENTION

This invention relates in general to fire detection systems. More specifically, it relates to an automatic fire detection system that processes signals responsive to both infrared (IR) and ultraviolet (UV) radiation in a manner that results in an unusually low incidence of false alarms.

In many situations it is important to monitor an area for fires or incipient explosions. A common example is a facility for the storage or transfer of highly flammable liquid such as liquid propane. Facilities of this type can extend over many acres and include storage tanks, pumping and compressor facilities, and truck loading areas. While most of such a facility is outdoors, portions may be indoors.

An automatic fire detection system for such a facility should respond reliably to any flame, but not trigger an alarm or extinguishers in response to sources of radiation other than a flame. These other sources include sunlight, lightning, welding, and hot objects such as an overheated compressor or the engine of a truck. The quality of the system therefore depends on its ability to discriminate between real flames and non-flame sources of radiation. Response time, sensitivity and range are also important characteristics of the system.

Many known systems respond to the radiation produced by a fire. It is common for such systems to sense IR radiation. For example, U.S. Pat. No. 3,665,440 issued in 1972 to McMenamin relies on the incorrect "fact" that a fire produces IR, but little or no UV. However, it is also known that fires do produce a detectable level of short wave UV radiation. Systems have been produced for many years by the assignee of the present application which detect fires by sensing the presence of short wave UV radiation. While these UV systems are effective and have proven to be commercially successful, they are susceptible to false alarms from non-fire sources of UV such as welding that may occur inside or outside the protected area.

U.S. Pat. Nos. 3,653,016; 3,665,440; 3,825,754; 3,931,521 and 4,199,682 disclose fire or explosion detection systems that employ multiple detection channels, UV detection in conjunction with IR detection, or a combination of these features. In each of these systems, however, the output signal of a detector is characterized by a digital, "yes-no" logic. In systems with multiple channels these digital outputs are applied to conventional logic gates such as AND or NOR gates to produce a resultant output signal that controls an alarm or extinguisher. In particular, the Cinzori '521 patent and the Spector et al. '682 patent apply outputs in excess of preset thresholds to NOR and AND gates respectively so that a fire is signaled when the inputs from both channels carry a positive indication for fire or some other monitored condition. In the Cormier '016 system, the main detector is responsive to visible light and a UV detector is connected in series in the main detector channel. It acts as a simple switch that confirms the presence of a fire. In McMenamin '440 the main detector is responsive to IR, but the system also analyzes the flicker frequency of the IR. Because the flicker frequency is relatively slow, the response time of the system is slow. In addition, McMenamin uses a positive UV output signal in a switch-like manner to inhibit the IR signal. The McMenamin device thus operates on a principle directly contradicted by known UV fire detectors since it assumes that there is little or no UV produced by a flame. It is also significant that the Cinzori '521 and '754 patents use detectors that operate exclusively in the IR spectrum.

While a number of fire detection systems are known, they continue to be susceptible to false alarms, particularly when used outdoors or in an environment where there are non-fire sources of UV such as welding. Known IR detection systems are also characterized by generally poor signal-to-noise ratios and a limited range.

It is therefore a principal object of the present invention to provide an automatic fire detection that reliably and quickly signals the presence of a fire in a protected area while at the same time discriminating sources of IR and UV radiation that are not produced by fire.

A further object of the present invention is to provide a system with the foregoing advantages that automatically compensates for time-varying levels in background IR.

Another object of the invention is to provide a system with the foregoing advantages that is not responsive to transient sources of non-fire radiation.

Yet another object of the invention is to provide a system with the foregoing advantages that is characterized even in outdoor use by excellent sensitivity without complex signal processing electronics and having a long range.

A further object is to provide a system with the foregoing advantages that has a fast response time and can be constructed for a heightened sensitivity to the combustion of a particular type of material.

Another object of this invention is to provide such a system which continuously monitors both IR and UV radiation and can be automatically tested.

A still further object is to provide a single detection system that can signal the presence of a fire, welding or high temperatures in a monitored area.

SUMMARY OF THE INVENTION

An automatic fire detection system has IR and UV detectors which monitor the same area simultaneously and continuously. The UV detector is responsive to radiation in the 190 to 270 nanometer range typically associated with fire. The IR detector is responsive to radiation lying in a narrow bandwidth that is uniquely associated with flames generated by the combustion of a preselected class of materials. In a preferred form for hydrocarbon flames, the IR detector is filtered to be responsive to radiation in the range of 4.1 to 4.7 micrometers.

IR and UV signal processing electronics continuously process the output signal of the associated detector to produce a normalized output signal proportional to the power of the radiation incident upon the respective detectors. In the UV channel, the processing electronics can include a one shot multivibrator that receives an input from the UV detector and provides an input signal to a ratio detector. In the IR channel, the processing electronics can include an operational amplifier whose output signal is supplied in series to a scaler and a voltage-to-frequency (V-F) converter to produce another input signal to the ratio detector. The IR processing electronics includes a feedback loop that automatically adjusts the threshold of the amplifier, in the absence of a UV output signal, to a level that does not amplify the existing background IR. The IR amplifier preferably has a constant, high gain.

The ratio detector forms a ratio of the normalized IR and UV input signals and compares them to a known range of values that are characteristic of the type of fire being monitored. If the detected ratio falls within the range, the ratio detector generates a fire signal. If the detected ratio is indicative of a preponderance of UV or IR radiation, it generates a UV or IR signal, respectively. A discriminator receives the output signals of the ratio detector. The discriminator generates one of these alarm signals only if the majority of the received output signals from the ratio detector are of the same type.

These and other features and objects of this invention will be more fully understood from the following detailed description which should be read in light of the accompanying drawings.

DETAILED DESCRIPTION OF THE PREFERRED EMBODIMENTS

Figure 2:
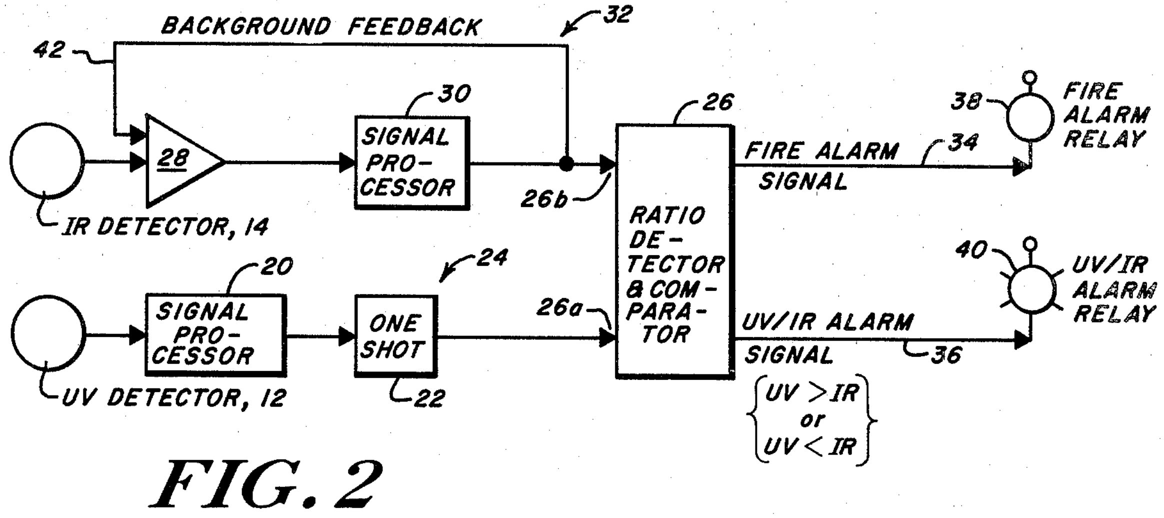
FIG. 2 is a simplified block diagram showing a fire detection system according to the present invention.
Figure 1:
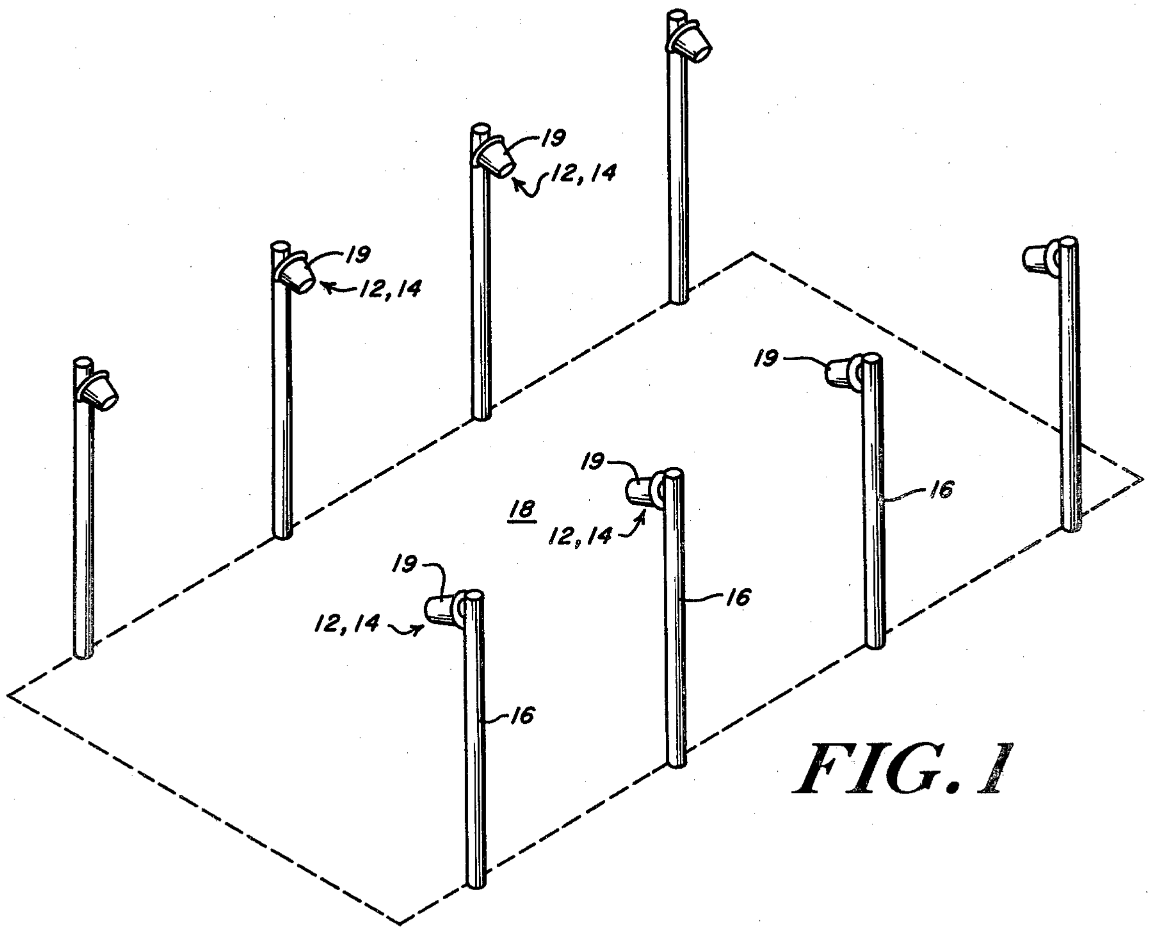
FIG. 1 shows the detector heads of a fire detection system according to the present invention arrayed to monitor a protected area.

FIG. 1 shows pairs of detectors 12 and 14 located in housings 19 which are mounted on support posts 16 and oriented to monitor a protected area 18 such as a facility for storing and transferring a highly flammable hydrocarbon or carbon based liquid. Referring to FIG. 2, the detectors 12 are responsive to ultraviolet (UV) radiation, particularly radiation in the 190 to 270 nanometer bandwidth characteristic of flames produced by the combustion of such liquids. Suitable detectors 12 are manufactured and sold by the Edison Electronics Division of Armtec Industries, Inc. under the trade designation "Edison U/V Tube". The detectors 14 are responsive to infrared (IR) radiation, particularly radiation lying in a narrow bandwidth characteristic of flames produced by the combustion of hydrocarbon and carbon based materials. A preferred bandwidth for the IR detectors is 4.1 to 4.7 micrometers centered on the $CO_2$ emission line at 4.4 micrometers. The bandwidth is selected by spectral filtering. Suitable IR detectors 14 are manufactured and sold by Barnes Engineering Company under the trade designations "Thermopiles" and "Pyroelectrics". The detectors 12 and 14 are paired so that one UV detector 12 and one IR detector 14 continuously monitor the same zone of the area 18. The following discussion will be limited to the output of one of these detector pairs, but it will be understood that multiple such pairs and associated circuitry can be used simultaneously to provide a continuous monitoring of an extensive area, including both outdoor and indoor zones.

With reference to FIG. 2, the output signal of the UV detector 12 is applied to a signal processor 20 which in turn provides an input to a one shot multivibrator 22. The detector 12, processor 20 and one shot multivibrator 22 together define a UV signal channel 24 that produces a normalized output that is supplied to one input **26*a* of a ratio detector 26. Similarly, the output signal of the IR detector 14 is applied to an amplifier 28 which in turn provides an input to the signal processor 30. The detector 14, amplifier 28 and signal processor 30 together define an IR signal channel 32 whose normalized output is supplied to another input 26*b* of the ratio detector 26**.

A principal feature of the present invention is the ratio detector 26 which forms a ratio of the normalized signals from the IR and UV channels. The ratio detector 26 then performs a comparison function. The ratio of the input signals is compared to a preselected range of values which are characteristic of ratios associated with a fire. If the ratio formed by the detector 26 falls within this range, then the ratio detector generates a "fire alarm signal" on line 34. If there is significantly more UV than IR received at the detectors 12 and 14, then the ratio falls outside this preselected range and the ratio detector 26 generates a "UV/IR alarm signal" on line 36. This signal is indicative of welding occuring in the zone of the protected area 18 monitored by the detectors 12 and 14. If there is significantly more IR than UV received at detectors 12 and 14, then the ratio falls outside the preselected range and the ratio detector 26 generates an IR output signal on line 36. This signal is indicative of an overheat condition such as diesel engine overheating in the protected area 18. While analog or digital electronic techniques can be used to form this ratio, this general arrangement for signal processing to discriminate between radiation generated by fire and that generated by non-fire sources is markedly different from conventional digital processing techniques discussed above that simply use AND or NOR gates. Digital electronics are preferred.

A "fire alarm signal" on the line 34 activates a relay 38 which can sound a fire alarm or initiate fire extinguishing equipment, or both. A "UV/IR alarm signal" on a line 36 similarly triggers the UV/IR alarm relay 40 that activates an alarm to provide a warning that there is welding or overheating occuring in the zone.

Another significant feature of the present invention is a feedback loop 42 from the ratio detector to the IR amplifier 28. The feedback loop 42 provides a continuous automatic adjustment of the threshold level of a signal that will be amplified by the IR channel 32. This adjustment occurs in the absence of a detected UV signal applied to the UV input **26*a* of the ratio detector. The threshold adjustment is such that the normalized IR output signal of the channel 32 to the ratio detector 26 is substantially zero. The net result is that background IR such as the IR of sunlight is constantly compensated. The IR detection channel 32 is therefore responsive only to unusual IR such as that generated by a fire. (IR from a non-fire source will not have the proper UV component and therefore the ratio detector will not identify this radiation as a fire.) It is also important to note that once the sensed IR at the detector 14 is above the compensated threshold level, the triggering of the alarm system does not require a large amount of energy in the IR spectrum. This feature provides an enhanced sensitivity and range to the detection system. The gain of the IR amplifier 28** can be high and remain constant. The net operational result is that the IR channel will detect small changes of radiation in the preselected bandwidth even with a comparatively large amount of background IR radiation.

The signal to noise ratio of the detection system is enhanced by the use of detectors 12 and 14 with suitable bandwidths as well as the automatic threshold adjusting circuitry described above. For hydrocarbon flames the preferred bandwidth of the IR detector is in the 4.1 to 4.7 micrometers range. This is a portion of the IR spectrum which has a comparatively low level of radiation due to sunlight but a comparatively high level of the radiation produced by fire. More specifically, within this bandwidth IR solar energy is approximately one-tenth that at 2.5 micrometers and is approximately one-fiftieth that at 1.5 micrometers. In contrast, the IR radiation produced by fire is approximately twice as great at this bandwidth than at either 1.5 or 2.5 micrometers. As a result, the selected IR bandwidth has a fire to sun noise ratio which is approximately 20 times better than in the 2.5 to 2.75 micrometer band and approximately 100 times better than in the 1.5 to 3.0 micrometer band.

The features described above yield a significant advantage over the prior art in that the sensitivity of the system is greater than that of prior art fire detection systems and the system can detect fires at much greater ranges. The increased range is due primarily to the increased sensitivity in the IR detection channel 32 including the feedback loop 42 and threshold adjusting circuitry in the amplifier electronics 28 (the UV detector being inherently a long range device). The IR detection is increased in range through a combination of (1) the foregoing bandwidth selection which provides the highest signal-to-noise ratio for fire to background radiation, (2) having a high gain IR amplifier 28 which has a constant gain for a fire signal but rejects background radiation using the automatic threshold compensating circuitry described above, and (3) the detector ratio 26 which produces a fire signal only if it detects simultaneous UV and IR radiations that are in the proper ratio characteristic of fire. Further sensitivity and range are provided by discriminating against ratio signals which are transient. This discriminating function will be described in more detail below with reference to FIG. 3.

While the foregoing fire detection circuit has been described with reference to the monitoring of hydrocarbon flames, it can be modified readily to monitor other forms of combustion such as a hydrogen fires. The detector 14 is filtered to focus on the $H_2O$ characteristic spectrum of the hydrogen flame. The values for the IR to UV ratio which will produce a fire alarm signal on the line 34 will also vary depending on the type of flame being monitored as well as the desired degree of sensitivity and range. A recommended range of normalized values, at least for hydrocarbon fires, is within 1:3 to 3:1.

Figure 3:
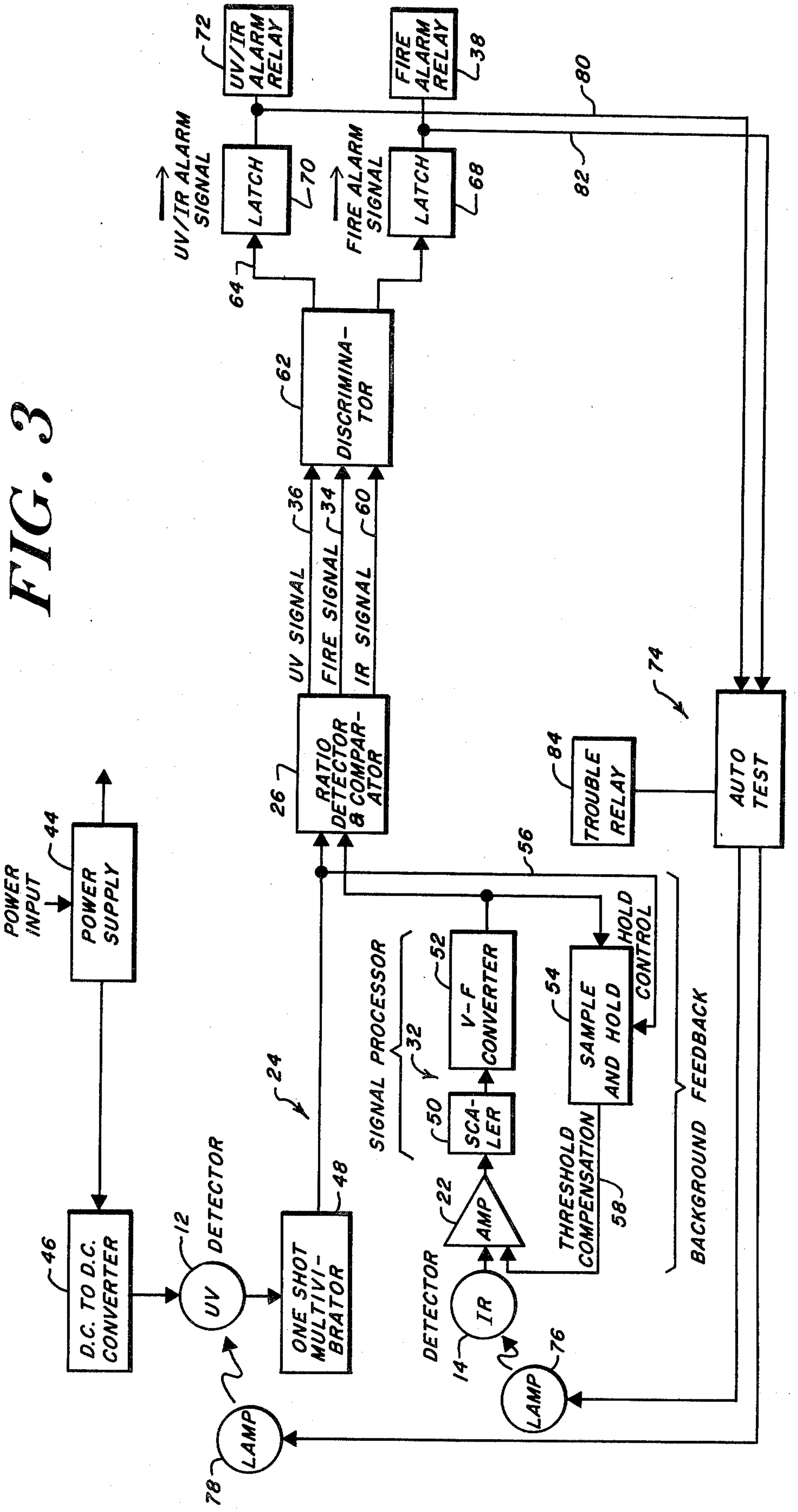
FIG. 3 is a more detailed block diagram of a fire detection system of the general type shown in FIG. 2.

FIG. 3 shows in block diagrammatic form a more detailed version of the circuit shown in FIG. 2 (like parts being identified with the same reference number). In the UV channel, a power supply 44 provides a DC output to a DC converter 46 which powers the UV detector 12. The output of the UV detector is applied to a one shot multi-vibrator 48 which provides the normalized output to the ratio detector 26. In the IR channel 32, the IR detector 14 supplies its output to the operational amplifier 22. The amplifier, in turn, supplies its output to a scaler 50 whose output is the square root of its input. This output is supplied to a voltage-to-frequency (V-F) converter 52. The IR output signal from the V-F converter is applied to the input **26*b* of the ratio detector 26. The threshold adjustment circuitry is provided by a discrete counter in 54 which samples the output of the V-F converter 52. The output of the multivibrator 48 is also applied over line 56 to the hold control of the sample and hold 54 to supply information concerning whether or not there is a detectable UV signal. When UV is present, the sample and hold counter is held to its preset level. In the absence of a UV signal on line 56, the counter in 54 generates a binary weighted analog output signal which is applied over line 58 to the operational amplifier 22** to adjust its operating threshold as described above.

In the fire detection system shown in FIG. 3, the ratio detector 26 uses conventional digital electronics circuitry to generate one of three output signals, a "fire signal" on line 34, a "UV signal" (or welding) on line 36, or an "IR signal" (or overheat) on line 60. The "IR signal" on the line 60 is generated by the ratio detector 26 when the detected ratio falls outside of the preselected range due to an excess of IR radiation. This signal can be used to indicate the presence of spontaneous combustion, an overheated compressor, or some other hot object which could ignite the highly flammable material in the area 18.

Another principal feature of the present invention is a discriminator 62 which receives as inputs the output signals of the ratio detector on the lines 34, 36 and 60. The discriminator produces a corresponding output signal if the majority of the received output signals fall in one of the three categories. If the majority of the signals are on line 34 indicating a radiation ratio characteristic of a fire, the discriminator generates "a fire alarm signal" on line 66 which operates a latch 68 which in turn triggers the "fire alarm relay" 38 . Similarly, if a majority of the output signals indicate an excess of UV or IR radiation, an output signal is generated by the discriminator 62 on line 64. It operates a latch 70 that triggers an "UV/IR alarm relay" 72 to sound an alarm that there is a potential risk of combustion in the protected area 18 due to welding or a dangerously high temperature.

The fire detection system of FIG. 3 also includes an automatic test circuit indicated generally at 74 which can produce an output signal that periodically illuminates lamps 76 and 78 to produce IR and UV radiation in the preselected bandwidths of the detectors 14 and 12, respectively. The lamps cause the detection system to react as though there were a fire in the monitored zone. The automatic test system 74 includes lines 80 and 82 which are connected between the latches 68 and 70 and their respective relays 38 and 72 so that during a test the output signal of the latches 68 and 70 is directed over the lines 80 and 82 to the auto test circuitry rather than relays 38 and 72. Output signals from the latches 68 and 70 indicative of a fire, welding or a dangerous IR condition produces a signal over the lines 80 and 82 that provides a confirmation that the system is operative. If the system fails to test properly, a trouble relay 84 is latched. The trouble relay 84 may be attached to a trouble alarm or trouble lamp.

While the fire detection system of the present invention has been described with reference to its preferred embodiments, various modifications and alterations will occur to those skilled in the art from the foregoing detailed description and the accompanying drawings. Such modifications and variations are intended to fall within the scope of the appended claims.

What is claimed is:

1. Means for automatically detecting flames in a preselected zone with an extremely low incidence of false alarms due to naturally occurring and man-made background radiation not generated by a flame comprising:

means for detecting ultraviolet (UV) radiation emanating from said preselected zone and generating a first signal corresponding to said UV radiation incident upon said UV detecting means;

means for detecting infrared (IR) radiation also eminating from said preselected zone and occurring in a narrow band, and generating a second signal corresponding to said IR radiation incident upon said IR detecting means;

electronic means for processing said first signal to produce a normalized UV signal;

electronic means for processing said second signal to produce a normalized IR signal; and electronic means for forming a ratio of said normalized UV signal to said normalized IR signal, comparing said ratio to a known range of values that is characteristic of the flames being detected, and generating a fire signal if said ratio falls within said range.

2. The detection means of claim 1 further comprising automatic threshold adjustment means for said IR signal processing means that continuously compensates for the background radiation.

3. The detection means of claim 2 wherein said adjustment means comprises a feedback loop from said IR signal processor means to an IR signal amplifying means that compensates said normalized IR signal by the value of said normalized IR signal in the absence of a normalized UV output signal.

4. The detection means of claim 1 further comprising electronic discriminator means that receives said fire signals and generates a discriminator output alarm signal indicative of a fire only if a majority of the output signals of said electronic ratio forming and comparison means are said fire signals.

5. The detection means of claims 1, 2, 3 or 4 wherein said IR detector is responsive to radiation lying primarily in a narrow bandwidth.

6. The detection means of claim 5 wherein said bandwidth is approximately 4.1 micrometers to 4.7 micrometers for hydrocarbon flames.

7. The detection means of claim 1 wherein said electronic ratio forming and comparison means includes means for generating a UV alarm output signal if said normalized UV signal exceeds said normalized IR signal and said ratio falls outside said known range.

8. The detection means of claim 1 wherein said electronic ratio forming and comparison means includes means for generating an IR alarm signal if said normalized IR signal exceeds said normalized UV signal and said ratio falls outside said known range.

9. The detection means of claim 3 wherein said electronic means for processing said second signal includes an amplifier with a high constant gain.

10. The detection means of claim 9 wherein said electronic means for processing said second signal further includes scaler means that receives the output signal of said amplifier and a voltage-to-frequency converter that receives the output signal of said scaler.

11. The detection means of claim 10 wherein said feedback loop includes a connection between the output of said converter to a sample and hold means whose output is connected to one input to said amplifier.

12. The detection means according to claim 10 wherein said scaler means produces an output signal that is approximately the square root of the input signal.

* * * * *